Patented Mar. 27, 1934

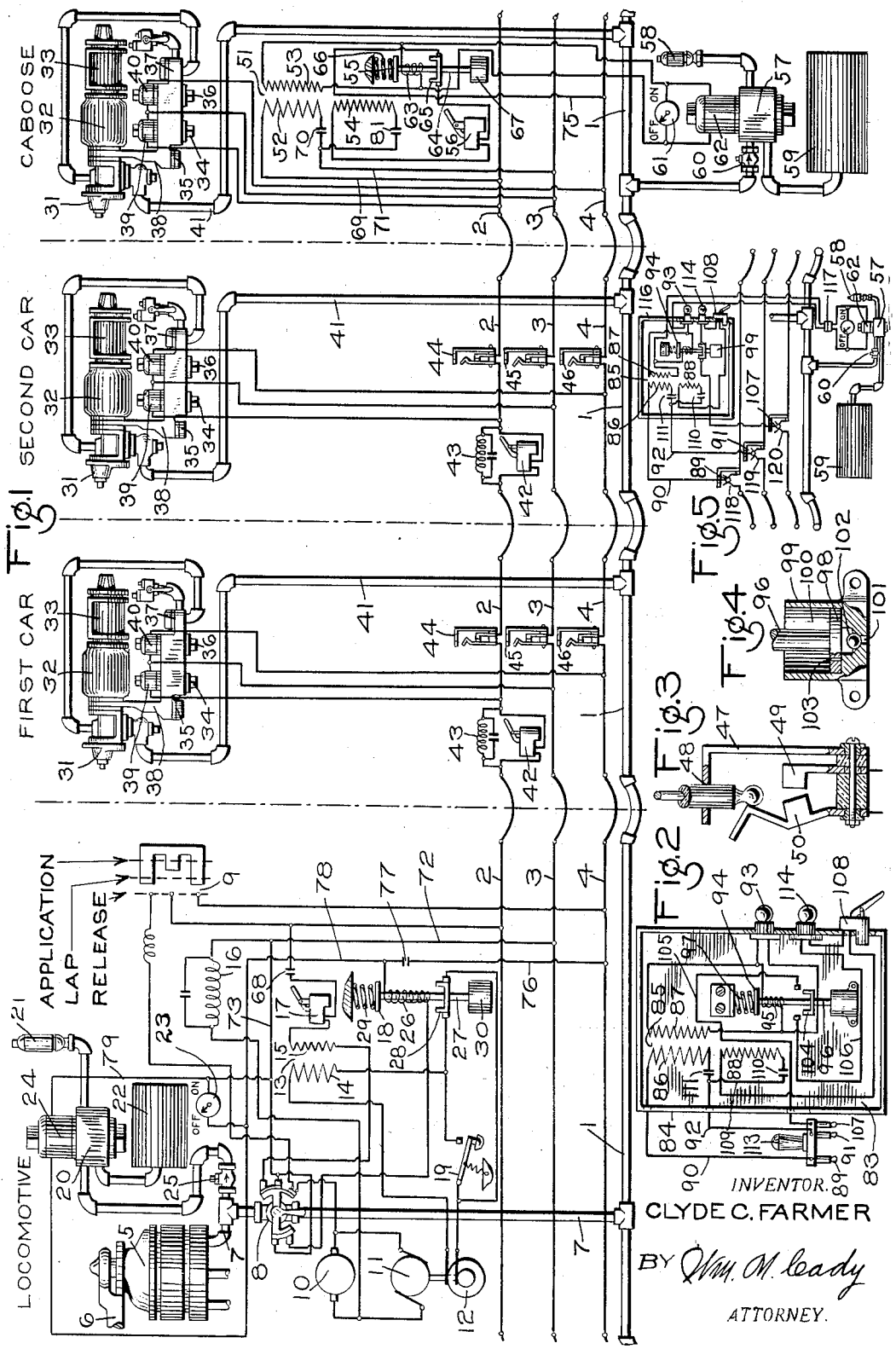

1,953,008

UNITED STATES PATENT OFFICE 1,953,008

TESTING APPARATUS FOR ELECTRO-PNEUMATIC BRAKE EQUIPMENTS

Clyde C. Farmer, Pittsburgh, Pa., assignor to The Westinghouse Air Brake Company, Wilmerding, Pa., a corporation of Pennsylvania Application January 24, 1931, Serial No. 510,974
Renewed May 6, 1933

21 Claims. (Cl. 303—1)

This invention relates to an electrically controlled brake equipment for trains and more particularly to means for detecting the location of faults which may develop in the electrical portion of the equipment.

The principal object of my invention is to provide a portable testing apparatus which may be plugged in the electric circuit system of the brake equipment at any car of the train and which is adapted to indicate the condition of that portion of the circuit system which is ahead of the car on which the apparatus is plugged in.

In the type of electrically controlled brake equipment such as is covered in my pending application for Letters Patent, filed January 10, 1931, and serially numbered 507,783, I employ the normally open circuit principle for controlling the brakes and the normally closed circuit principle for indicating the condition of the electrical portion of the equipment and for signalling, and a more specific object of my invention is to provide a portable testing apparatus which may be plugged in the electric circuit system of the equipment at any car of the train and which when so plugged in, will indicate the condition of that portion of the system which is in advance of the car on which the apparatus is plugged in and which is operable to initiate a signal to the operator at the head end of the train.

Other objects and advantages will appear in the following more detailed description of the invention.

In the accompanying drawing; Fig. 1 is a diagrammatic view of an electro-pneumatic brake equipment having means for facilitating the plugging in of a testing apparatus; Fig. 2 is a diagrammatic sectional view of a portable testing apparatus designed in accordance with my invention; Fig. 3 is an enlarged detail view, partly in section, of one of the jack switches interposed in the electrical portion of the brake equipment; Fig. 4 is an enlarged detail sectional view of a portion of a slow acting relay switch device; and Fig. 5 illustrates a modification of the invention in which the testing apparatus normally constitutes a part of the caboose equipment.

In Fig. 1 of the drawing I have illustrated an electro-pneumatic brake equipment which is substantially the same as that fully described in the aforementioned pending application, the only difference being that in the present application, a jack switch device is interposed in each train wire of the equipment on each car.

Since the details and operations of the several parts of the equipment have been fully described in the above mentioned pending application, a brief description of the equipment is all that is deemed necessary in the present case.

As shown in Fig. 1 of the drawing, the electro-pneumatic brake equipment may comprise the usual train brake pipe 1 and train wires 2, 3 and 4, which wires will hereinafter be respectively termed, application wire, return wire and release wire.

The locomotive equipment may comprise the usual brake valve device 5 which is adapted to be manipulated through the medium of a handle 6 to control the train brakes pneumatically, and which is connected to the brake pipe 1 through a pipe 7 which has a combined double heading cock and switch device 8 interposed therein.

The locomotive equipment may further comprise a brake switch device 9 which is operative manually to electrically control the brakes, a turbo-generator 10 for generating direct current, a direct current motor 11 which is connected in circuit with the generator 10 and is caused to operate by the current generated thereby, an alternating current generator 12 which is driven by the motor 11, a transformer 13 having primary and secondary windings 14 and 15 respectively, a tuned impedance coil 16, a signal switch device 17, a slow acting relay switch device 18, a reset switch device 19, a magnet valve device 20, a warning sounding device such as a whistle 21, a reservoir 22, and an electrically controlled device 23 for visibly indicating a warning.

The magnet valve device 20 comprises a magnet 24 which, while energized, maintains two double beat valves in such positions that fluid under pressure from the pipe 7 is supplied to the reservoir 22 and that communication from the reservoir to the whistle 21 is closed. When the magnet is deenergized, the double beat valves are caused to assume positions in which communication from the pipe 7 to the reservoir 22 is closed and communication from the reservoir to the whistle is established. In the connection from the pipe 7 to the magnet valve device 20 there is interposed a check valve device 25 which is adapted to prevent back flow of fluid under pressure from the reservoir 22 to the pipe 7 when brake pipe pressure is less than the pressure of fluid in the reservoir.

The slow acting relay switch device may comprise an operating coil 26 which is adapted when energized to maintain the plunger stem 27 of the device in the position shown in Fig. 1, in which position the switch member 28 carried by the stem maintains a circuit closed through the generator 12 and primary winding 14 of the transformer 13. When the coil 26 is deenergized, the pressure of a spring 29 causes the stem to move downwardly toward circuit opening position, the speed at which the stem is thus moved being controlled by a dashpot mechanism 30 which operates to yieldably resist the pressure of the spring.

Each of the car equipments and the caboose equipment may comprise a triple valve device 31 which is connected to the brake pipe 1 through a pipe 41, an auxiliary reservoir 32, a brake cylinder 33, an application magnet valve device 34, an application valve device 35, a release magnet valve device 36 and a release valve device 37, said magnet valve devices and application and release valve devices being carried by a pipe bracket 38 which is clamped between the triple valve device and auxiliary reservoir.

The application magnet valve device 34 comprises a magnet 39 having one of its terminals connected to the application wire 2 and its other terminal connected to the return wire 3. The release magnet valve device 36 comprises a magnet 40 having one of its terminals connected to the release wire 4 and its other terminal connected to the return wire 3. With the magnets 39 and 40 deenergized, the application valve device 35 is maintained closed so that fluid under pressure from the auxiliary reservoir 32 cannot flow to the brake cylinder 33 and the release valve device 37 will permit communication from the brake cylinder to the atmosphere.

When both magnets 39 and 40 are energized, the release valve device 37 is caused to operate to close communication from the brake cylinder to the atmosphere and the application valve device 35 is caused to operate to supply fluid under pressure from the auxiliary reservoir to the brake cylinder to effect an application of the brakes.

When the magnets 39 and 40 have been energized and the magnet 39 is deenergized and the magnet 40 maintained energized, the application valve device 35 will be caused to operate to close off the flow of fluid from the auxiliary reservoir to the brake cylinder so as to limit brake cylinder pressure.

Each of the car equipments also comprises a signal switch device 42 which is interposed in the application train wire 2 and further comprises a tuned impedance coil 43, the terminals of which are connected to the application wire 2 at opposite sides of the switch device 42, said coil permitting the flow of direct current therethrough and preventing the flow of alternating current therethrough.

Carried by each car and located where they are accessible to a trainman who may be walking along the side of the train, are jack switch devices 44, 45 and 46 which are interposed in the train wires 2, 3 and 4 respectively.

Each of these jack switch devices may comprise a guide portion 47 having an opening 48 formed therein for the reception of a switch plug hereinafter described, a stationary contact member 49 which is connected to one of the train wires, and a resilient contact member 50 which is connected to the same train wire. As shown in Fig. 1 of the drawing, the contact member 50 of each jack switch device normally engages the contact member 49 so that the train wire in which the device is interposed will be, in effect, continuous throughout the cars.

The caboose equipment besides having the brake controlling devices before described also comprises a transformer 51 having a primary winding 52, a secondary winding 53 and a secondary winding 54 and further comprises a slow acting relay switch device 55, a signal switch device 56, a magnet valve device 57, a warning sounding device such as a whistle 58, a reservoir 59, a check valve device 60 and an electrically controlled device 61 for visibly indicating a warning.

The magnet valve device 57 comprises a magnet 62 which is connected in circuit with the secondary winding 53 of the caboose transformer 51. The warning device 61 is connected across the secondary winding 53.

It will here be noted that the magnet valve device 62 of the caboose equipment is identical in construction and operation with that of the corresponding device 20 of the locomotive equipment.

The slow acting relay switch device 55 may be identical with the corresponding device 18 of the locomotive equipment, comprising an operating coil 63 which is connected across the circuit of the secondary winding 53 of the caboose transformer 51 which coil, when energized, maintains the plunger stem 64 of the device in its upper position as shown in Fig. 1, so that the switch member 65 carried by the stem will be maintained in its circuit closing position against the apposing pressure of the spring 66. When the operating coil 63 is deenergized, the pressure of the spring 66 causes the stem 64 and switch member 65 carried thereby to move toward circuit opening position, such movement being yieldably resisted by the dashpot mechanism 67.

From Fig. 1 of the drawing it will be seen that the secondary winding 15 of the locomotive transformer 13 and the primary winding 52 of the caboose transformer 51 are connected together in a normally closed circuit, which is traced from one terminal of the secondary winding 15, through the normally closed locomotive switch device 17, a condenser 68, a wire 69, the application wire 2 and through the normally closed car signal switch devices 42 and normally closed jack switch devices 44 on the cars, a wire 69 to one terminal of the primary winding 52 of the caboose transformer, through said winding, a condenser 70, a wire 71, the return train wire 3, wires 72 and 73, the switch portion of the combined double heading cock and switch device 8 and wire 74 to the lower terminal of the secondary winding 15 of the locomotive transformer.

Assuming the train equipment to be in the condition shown in Fig. 1, the primary winding 14 of the locomotive transformer is energized by current from the generator 24 which causes an alternating current to be induced in the circuit just traced, energizing the primary winding 52 of the caboose transformer. With the primary winding 52 thus energized, alternating current is induced in the closed warning circuit through the secondary winding 53 and the magnet 62 of the magnet valve device 62 on the caboose, thus maintaining the magnet 62 energized and causing the indicating device 61 to operate to indicate that this warning circuit is energized and that the electrical equipment is in its proper working condition. With the magnet 62 energized, the whistle 58 will not sound and communication from the brake pipe to the reservoir 59 will be established, so that fluid under pressure may flow from the brake pipe to the reservoir.

Current flowing through the primary winding 52 also induces an alternating current in the secondary winding 54, which winding is connected in circuit with the magnet 24 of the magnet valve device 20 of the locomotive equipment. Current induced in this winding 54 flows from one terminal of the winding through the normally closed caboose signal switch device 56, switch member 65 of the relay switch device 55, a wire 75, the release train wire 4, a wire 76, a condenser 77, a wire 78, the winding of the magnet 24, a wire 79, wires 73 and 72, return train wire 3, wire 71 of the caboose equipment, a wire 80 and a condenser 81 to the other terminal of the winding 54. Current flowing through this circuit maintains the magnet 24 energized so that communication from the pipe 7 to the reservoir 22 is maintained open and communication from the reservoir to the whistle 21 is maintained closed. Since the last mentioned communication is maintained closed, the whistle 21 will remain silent. The warning device 23 will however operate to indicate that this warning circuit is energized.

One terminal of the operating coil 26 of the relay switch device 18 of the locomotive equipment is connected to the wire 78 and the other terminal is connected to the wire 73 through the switch portion of the combined double heading cock and switch device 8, so that with the warning circuit last described energized, the coil 26 is maintained energized. With the coil 26 thus energized, the stem 27 and switch member 28 will be maintained in their upper positions as shown in Fig. 1 in which the switch member 28 maintains the circuit through the generator 12 and the primary winding 14 of the transformer 13 closed.

With the brake switch device 9 in its release position, as shown in Fig. 1, the brake controlling circuit system is deenergized. With the brake switch device in application position, the circuit through the generator and magnets 39 and 40 of the car and caboose equipments is closed, so that current from the generator 10 energizes the magnets 39 and 40, causing the magnet valve devices 34 and 36 to operate to effect an application of the brakes. With the brake switch device in lap position, each of the application magnet valve devices 34 is deenergized and each of the release magnet valve devices 36 is maintained energized. With the application magnet valve devices deenergized, the application valve devices 35 are caused to operate to close off the supply of fluid under pressure from the auxiliary reservoirs 32 to the brake cylinders 33, and with the release magnet valve devices maintained energized, the release valve device 37 prevents the release of fluid under pressure from the brake cylinder.

The condenser 77 of the locomotive equipment prevents the flow of direct current to the coil 26 of the relay switch device 18 and to the magnet 24 of the magnet valve device 20 and the condenser 68 prevents the flow of direct current through the secondary winding 15 of the transformer 13. On the caboose the condenser 79 prevents the flow of direct current through the primary winding 52 of the transformer 51 and the condenser 81 prevents the flow of direct current through the secondary winding 54 of the transformer 51.

The tuned impedance coil 16 of the locomotive equipment prevents the flow of alternating current to the direct current generator 10.

It will be understood from the foregoing description and from the description contained in my aforementioned pending application that when the normally open brake controlling circuit system is not in condition for controlling the brakes, the warning circuit system is deenergized and as a consequence, fluid under pressure is supplied from the reservoir 22 on the locomotive to the connected whistle 21, causing the whistle to sound a warning to the operator and further, fluid under pressure is supplied from the reservoir 59 on the caboose to the connected whistle 58, causing the whistle to sound a warning on the caboose. The warning devices 23 and 61 on the locomotive and caboose respectively will also operate to indicate that the warning circuits are deenergized.

When the operator has been warned that the electrical equipment is not in the proper brake-controlling condition, he controls the brakes by the use of the brake valve device 5 in the usual well known manner and when the trainmen in the caboose have been warned of this condition they will be prepared to locate and eliminate the fault in the system after the train is brought to a stop.

For the purpose of facilitating the locating of a fault in the electrical equipment, I provide a portable testing apparatus 83, which may be carried in the caboose or locomotive or the locomotive and caboose may each carry a testing apparatus.

The testing apparatus 83 may comprise a casing 84 in which there is suitably mounted a transformer 85 having a primary winding 86, a secondary winding 87 and another secondary winding 88. One terminal of the primary winding 86 is connected to a switch plug 89 by a wire 90, and the other terminal is connected to a switch plug 91 by a wire 92. Connected across the terminals of the secondary winding 87 is an indicating device 93 which, in the present instance is in the form of an incandescent lamp which is mounted on the casing in such a manner as to be visible to the trainman carrying the testing apparatus. It will here be understood that if desired, an electric buzzer or bell may be used in place of the incandescent lamp and when either of these sounding devices are employed they may be enclosed in the casing.

Also mounted in the casing 84 is a slow acting relay switch device 94 which comprises an operating coil 95 which is connected across the terminals of the secondary winding 87 and which, when energized, is adapted to operate a plunger stem 96 upwardly against the opposing pressure of a spring 97. At its lower end the plunger stem is provided with a plunger 98 which is contained in a dashpot 99 secured to the casing and is movable inwardly and outwardly relative to the dashpot. When the plunger 98 is caused to move outwardly upon the energization of the coil 95, fluid from the atmosphere flows to the chamber 100 in the dashpot casing by way of an inlet passage 101 and past a ball check valve 102. Upon the deenergization of the coil 95, the pressure of the spring 97 causes the plunger 98 to be moved inwardly. When the plunger is thus moved, the check valve 102 operates to prevent the escape of fluid from the chamber 100 to the atmosphere through the passage 101 but fluid is permitted to escape to the atmosphere through a small vent port 103 in the plunger. Since the escape of fluid through the port 103 will be at a slow rate, the pressure of the spring 97 acting on one side of the plunger will be yieldably resisted by the pressure of fluid in the chamber 100, thus insuring the slow action of the stem 96.

The stem 96 carries a switch member 104 which, when the stem is in its outer position, forms a connection between the adjacent ends of wires 105 and 106, the other ends of the wires being connected to a switch plug 107 and one terminal of a switch device 108 respectively. The other terminal of the switch device is connected to one terminal of the secondary winding 88, the other terminal of the winding being connected by a wire 109 to the wire 92.

Interposed in the wire 106 is an incandescent lamp 114 which is so mounted on the casing 84 that it is visible at all times.

Interposed in the wire 109 is a condenser 110 which is adapted to prevent the flow of direct current through the secondary winding 88 and interposed in the wire 92 intermediate the end of the primary winding 86 and the point at which the wire 109 is connected to the wire 92, is a condenser 111 which is adapted to prevent the flow of direct current through the primary winding 86.

The switch device 108 is secured to casing 84 in such a manner that the operating handle 112 of the device is operable from the exterior of the casing.

The switch plugs 89, 91 and 107 are preferably mounted on a single holder 113 and are unequally spaced and the jack switches 44, 45 and 46 for the reception of the switch plugs may be correspondingly spaced so as to insure the proper connections being made when the testing apparatus is plugged in the equipment.

The switch devices 17, 42, 56 and 108 are each identical with the signal switch device shown and described in the aforementioned pending application. Each of these switches is normally in circuit closing position and when it is desired to open the circuit for signalling, the operating handle of the device is first pressed inwardly and then released. Upon the release of the handle the device will operate to automatically open and close the circuit in which the device is interposed.

The electrical equipment of the portable testing apparatus with the exception of the incandescent lamp 114, is substantially the same as the electrical equipment on the caboose, which completes the warning circuit system at the rear end of the train, so that when the testing apparatus is plugged in the system at any car it completes the warning circuit at the car where it is plugged in.

With the equipment shown in Fig. 1, if there should be an unintentional interruption in the flow of current through the normally closed warning circuit system, which may be caused by the breakage of a train wire or for any other reason, the warning devices on the locomotive, as well as those on the caboose, will indicate that the brake circuit system is not in condition to control the brakes and the slow acting switch devices 55 and 18 will be caused to operate to deenergize the circuits which they control, the device 55 opening the circuit through the coil 26 of the relay switch device 18 and magnet 24 of the magnet valve device 20 and the relay switch device opening the circuit through the primary winding 14 of the locomotive transformer 13, causing the deenergization of the current transmission circuit throughout the length of the train.

When the warning devices operate to indicate a fault in the electrical equipment, the operator, by the use of the brake valve device 5, may, at any time, cause the train to be brought to a stop. Now while the train is stopped, the operator's switch 19 will be held in its circuit closed position in order to maintain the primary winding 14 of the locomotive transformer 13 energized, which in turn, maintains the secondary winding 15 and the train wires 2 and 3 energized. A trainman searching for the fault in the system carries the testing apparatus along the train and plugs the apparatus in the system at any car, the switch plugs 89, 91 and 107 being inserted in the jack switches 44, 45 and 46 respectively.

If the application and return train wires 2 and 3, respectively, from the head end of the train to the place where the testing apparatus is plugged in are in their proper condition, primary winding 86 of the testing apparatus is energized and induces current in the secondary winding 87 and causes the incandescent light 93, which is connected in circuit therewith, to light, thus indicating that the wires 2 and 3 are in proper condition. Current induced in the secondary winding 87 also energizes the operating coil 95 of the relay switch device 94, which causes the plunger stem 96 to move upwardly against the opposing pressure of the spring 97, carrying with it the switch member 104 into connecting engagement with the wires 105 and 106. Now if the release wire is in its proper condition, the incandescent lamp 114 will light. With both lights glowing, the trainman will know that the fault is back of the car on which the testing apparatus is plugged in the circuit system.

If when the testing apparatus is plugged in the circuit system, the lamp 93 glows and the lamp 94 does not, the trainman will known that the fault is in the release wire 4 at some point ahead of the car on which the apparatus is plugged in. If the lamp 93 does not glow he will know that the fault is in either train wire 2 or 3.

If both lamps glow when the testing apparatus is initially plugged in the circuit system at any car, the trainman who is searching to find the fault in the system, plugs the apparatus in the system at each succeeding car toward the rear end of the train until the lamp 114 fails to glow or both lights 93 and 114 fail to glow, in either of which cases, he will know that the fault in the system is located between the jack switches which are engaged by the switch plugs and the set of jack switches from which the plugs were last removed. If when the testing apparatus is initially plugged in, the lamp 114 or both lamps fail to glow, the apparatus will be plugged in the system at each succeeding car toward the front of the train until both lamps glow, thus indicating that the fault in the system is located between the set of jack switches which are engaged by the switch plugs and the set of jack switches from which the plugs were last removed.

In some cases, when the fault in the circuit system has been located, the necessary repairs may be made without removing a car or cars from the train and when such is the case, the trainman, after making the repairs, may signal from the caboose to the operator that the circuit system is in its proper condition, the caboose signal switch device 56 being operated to initiate such a signal. When the operator receives this signal he permits the reset switch 19 to return to its circuit open position as shown in Fig. 1, the circuit through the primary winding being closed by the switch member 28 when the operating coil 26 is energized upon the repairs to the system being made.

If the fault in the circuit cannot be repaired or exactly located by the trainman, it may be desired to remove from the train at the first opportunity, the car on which the circuit system is defective, and when such is the case, the trainman plugs the testing apparatus in the car ahead of the one in which the system is defective and by the use of the switch device 108, may signal to the engineer that a car is to be removed from the train and by this signal may inform the operator as to the location of the car on the train.

In some train operations, it may be that a caboose will not be used and in such cases where it is desired to control the brakes electrically, my testing apparatus which may be carried in the locomotive, may be plugged in the last car to complete the electric circuit system.

In Fig. 5 a modification of the invention is illustrated in which a portable testing apparatus 116 is provided which normally forms the part of the caboose equipment necessary to complete the electric circuit system at the rear end of the train. This testing apparatus 116 is quite similar to the testing apparatus 83 and due to this, like parts of the devices are referred to by like reference characters. One difference, however, in the testing apparatus 116 is that, the circuit wires from the opposite ends of the primary winding 87 extend out through the casing 84 and are connected to the magnet 62 of the magnet valve device 57 on the caboose by a connector 117. When the testing apparatus is in use as a necessary part of the caboose equipment, as shown in Fig. 5, the switch plugs 89, 91 and 107 are engaged by the jack switches 118, 119 and 120 respectively, and when it is desired to remove the apparatus from the caboose to test the circuit system from the cars on the train, the switch plugs are pulled out of the jack switches and the connector 117 is separated. The testing apparatus may now be carried along the train and used in the same manner as the testing apparatus 83, the portion of the connector 117 which is carried by the circuit wires from the secondary coil 87 serving no purpose whatever in testing the circuit system.

When the testing apparatus 116 is used, the signal switch device 56 is omitted and the signal switch device 108 will be used in lieu thereof for signalling from the caboose.

From the foregoing description, it will be seen that I have provided a portable testing apparatus for use with the brake electric circuit system disclosed in my aforementioned pending application, which apparatus when plugged in the system at any car of the train completes one end of the system and will indicate the condition of that portion of the circuit which is between the apparatus and the source of current of the system. This portable apparatus when plugged in the system is also utilized to transmit and receive signals when that portion of the system from the apparatus to the head end of the train is in its proper working condition. Further, this portable apparatus may be used to complete the rear end of the electric circuit system of the train when a caboose is not used.

It will be understood that the circuit system disclosed in this application and which comprises a normally open circuit, a normally closed circuit and means for indicating the integrity of the circuit system is broadly claimed in my aforementioned pending application, and that the claims in the present application which relate to this feature are intended to cover; in combination with such a circuit system, a portable testing apparatus which, when a fault in the circuit system develops, is adapted to be plugged in the circuit system at any car in searching for the fault in the system.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In an electrically controlled train brake equipment comprising an electric circuit system, the combination with means operating on said circuit system for controlling the brakes, of means also operating on said circuit system for indicating the condition of the system, and portable means adapted to be interposed in said circuit system at any car in the train for indicating, when so interposed, the condition of the system from the point where the portable means is interposed to one end of the train.

2. In an electrically controlled train brake equipment comprising an electric circuit system, the combination with means operating on said circuit system for controlling the brakes, of means also operating on said circuit system for indicating the condition of the system, and portable means adapted to be plugged in said circuit system at any car in the train operable when plugged in the system to indicate the condition of the system from the point where the portable means is plugged in to the head of the train.

3. In an electrically controlled train brake equipment having an electric circuit system comprising a normally open circuit and a normally closed circuit, the combination with means operating on said normally open circuit for controlling the brakes, of means operating on said normally closed circuit for indicating the condition of said normally open circuit from one end of the train to the other, and portable means adapted to be interposed in said circuit system at any car in the train and when so interposed operating on said normally closed circuit to indicate the condition of the circuit system at one side of the portable means.

4. In an electrically controlled train brake equipment having an electric circuit system comprising a normally open circuit and a normally closed circuit, the combination with means operating on said normally open circuit for controlling the brakes, of means operating on said normally closed circuit for indicating the condition of said normally open circuit from one end of the train to the other, and portable means adapted to be interposed in said circuit system at any car in the train and when so interposed operating on said normally closed circuit to indicate the condition of the normally open circuit at one side of the portable means.

5. In an electrically controlled train brake equipment having an electric circuit system comprising a normally open circuit and a normally closed circuit extending throughout the length of the train and completed at each end of the train, the combination with means operating on said normally open circuit for controlling the brakes, means operating on said normally closed circuit for indicating the condition of said normally open circuit, and portable means adapted to be interposed in the circuit system on any car and when so interposed completing the circuit system at said car and for indicating the condition of the normally open circuit from one end of the train to the portable means.

6. In an electrically controlled train brake equipment, the combination with a normally open electric circuit, of means operating on said normally open circuit for controlling the brakes, a normally closed circuit, means operating on said normally closed circuit for indicating the condition of said normally open circuit from one end of the train to the other, and portable means adapted to be plugged in said circuits at any one of a plurality of points along the train indicating, when so plugged in said circuits, the condition of said normally open circuit from one end of the train to the point where the portable means is plugged in the circuits.

7. The combination with electrically controlled devices on the cars and caboose of a train adapted upon energization to effect an application of the brakes and a plurality of main train wires connected to said devices, of a source of current normally cut out of circuit with said train wires, a switch device operative to close a circuit through said wires, devices and source of current to effect the energization of said devices, a warning circuit system including said train wires, a source of current for said warning circuit system, and means adapted to be plugged in said warning circuit system at intervals throughout the length of the train for closing the warning circuit system at the point where the means is plugged in the circuit, said means when so plugged in the warning circuit system indicating the condition of the brake controlling circuit from the point where the means is plugged in to the head end of the train.

8. The combination with electrically controlled devices on the cars and caboose of a train adapted upon energization to effect an application of the brakes and a plurality of main train wires connected to said devices, of a source of current normally cut out of circuit with said train wires, a switch device operative to close a circuit through said wires, devices and source of current to effect the energization of said devices, a warning circuit system including said train wires, a source of current for said warning circuit system, means on the head end of the train and included in said warning circuit system for indicating the condition of said train wires, and portable means adapted to be plugged in said circuit with said train wires at any one of a plurality of points throughout the length of the train for indicating the condition of said train wires from the point where said portable means is plugged in to the head end of the train.

9. The combination with electrically controlled devices on the cars and caboose of a train adapted upon energization to effect an application of the brakes and a plurality of main train wires connected to said devices, of a source of current normally cut out of circuit with said train wires, a switch device operative to close a circuit through said wires, devices and source of current to effect the energization of said devices, a normally closed warning circuit system, means operating on said warning circuit system for indicating the condition of the brake controlling circuit, means normally closing the warning circuit system at the caboose, and portable means adapted to be plugged in circuit with said train wires on any car of the train for closing the warning circuit system at the car where said portable means is plugged in and for indicating the condition of the brake controlling circuit from the point where the portable means is plugged in circuit with the train wires to the head end of the train.

10. The combination with electrically controlled devices on the cars and caboose of a train adapted upon energization to effect an application of the brakes and a plurality of main train wires connected to said devices, of a source of current normally cut out of circuit with said train wires, a switch device operative to close a circuit through said wires, devices and source of current to effect the energization of said devices, a warning circuit system, means operating on said warning circuit system for indicating the condition of the brake controlling circuit, means normally closing the warning circuit system at the caboose, and portable means adapted to be plugged in circuit with said train wires on any one of said cars to close the warning circuit system on the car in which the portable means is plugged in and to indicate the condition of the brake controlling circuit ahead of the point at which the portable means is plugged in circuit with the train wires.

11. In an electric brake system for a train, the combination with means operating on a normally open circuit for controlling the brakes, of means operating on a normally closed circuit for indicating the condition of said normally open circuit, signal initiating switch devices located at intervals throughout the length of the train operable to open and close said normally closed circuit for controlling the operation of the indicating means to indicate a signal, portable means adapted to be plugged in said normally closed circuit at any one of a plurality of points throughout the length of the train for indicating the condition of the normally open circuit ahead of the point at which the portable means is plugged in the normally closed circuit, and a signal switch device included in said portable means operable to open and close said normally closed circuit to control the operation of the indicating means to indicate a signal.

12. The combination with electrically controlled devices on the cars and caboose of a train adapted upon energization to effect an application of the brakes and three main train wires connected to said devices, of a source of current on the head end of the train normally cut out of circuit with said train wires, a switch device operable to close the circuit through the train wires, source of current and devices to effect the energization of said devices, a circuit including the main train wires and normally closed at the head end of the train and at the caboose, means included in the normally closed circuit for indicating the condition of the normally open circuit, and a portable apparatus adapted to be interposed in the normally closed circuit for indicating the condition of the normally open circuit ahead of the point at which the portable apparatus is interposed in the normally closed circuit.

13. The combination with electrically controlled devices on the cars and caboose of a train adapted upon energization to effect an application of the brakes, and three main train wires connected to said devices, of a source of current on the head end of the train normally cut out of circuit with said train wires, a switch device operable to close the circuit through the train wires, source of current and devices to effect the energization of said devices, a circuit including the main train wires and normally closed at the head end of the train and at the caboose, means included in the normally closed circuit for indicating the condition of the normally open circuit, and a portable apparatus adapted to be interposed in the normally closed circuit for closing the normally closed circuit at the point where the apparatus is interposed in the circuit and for indicating, when so interposed, the condition of the normally open circuit from the point at which the apparatus is interposed in the circuit to the head end of the train.

14. The combination with electrically controlled devices on the cars and caboose of a train adapted upon energization to effect an application of the brakes and three main train wires connected to said devices, of a source of current on the head end of the train normally cut out of circuit with said train wires, a switch device operable to close the circuit through the train wires, source of current and devices to effect the energization of said devices, a normally closed warning circuit, a source of current for said normally closed circuit, means included in said warning circuit for indicating the condition of said normally open circuit, and a portable apparatus carried by said caboose and normally closing the warning circuit at said caboose and being adapted to be removed from said caboose and to be interposed in said warning circuit at any one of said cars to close the warning circuit at the car where it is interposed in circuit and to indicate the condition of the normally open circuit ahead of the point where the portable apparatus is interposed in the circuit.

15. The combination with electrically controlled devices on the cars and caboose of a train adapted upon energization to effect an application of the brakes and three main train wires connected to said devices, of a source of current on the head end of the train normally cut out of circuit with said train wires, a switch device operable to close the circuit through the train wires, source of current and devices to effect the energization of said devices, a normally closed warning circuit, a source of current for the normally closed circuit, means included in said warning circuit for indicating the condition of said normally open circuit, and a portable apparatus removably carried by said caboose and normally closing the warning circuit at said caboose, said portable means being adapted to be removed from said caboose and to be interposed in said warning circuit at any one of said cars to close the warning circuit at the car where the apparatus is interposed in the warning circuit.

16. In an electric brake system for a train, the combination with means operating on a normally open circuit for controlling the brakes, of a normally closed circuit system for indicating the condition of said normally open circuit and including a current transmission circuit and two warning circuits inductively coupled with said current transmission circuit, warning means included in and operating on each of said warning circuits for indicating the condition of said normally open circuit, and a portable device adapted to be interposed in said normally closed circuit system at any car in the train for closing the current transmission and warning circuits at the point where the portable device is interposed in the system.

17. In an electric brake system for a train, the combination with means operating on a normally open circuit for controlling the brakes, of a normally closed circuit system for indicating the condition of said normally open circuit and including a current transmission circuit and two warning circuits inductively coupled with said current transmission circuit, warning means included in and operating on each of said warning circuits for indicating the condition of said normally open circuit, a portable device adapted to be interposed in said normally closed circuit system at any one of a plurality of points throughout the length of the train for closing the current transmission and warning circuits at the point where the portable device is interposed in the system, and means included in said portable device for indicating the condition of the normally open circuit ahead of the point at which the portable device is interposed in the circuit system.

18. In an electric brake system for a train, the combination with means operating on a normally open circuit for controlling the brakes, of a normally closed circuit system for indicating the condition of said normally open circuit and including a current transmission circuit and two warning circuits inductively coupled with said current transmission circuit, warning means included in and operating on each of said warning circuits for indicating the condition of said normally open circuit, a portable device adapted to be interposed in said normally closed circuit system at any one of a plurality of points throughout the length of the train for closing the current transmission and warning circuits at the point where the portable device is interposed in the system, and means included in said portable device for indicating the condition of said normally open circuit and said normally closed circuit system ahead of the point at which said device is interposed in the circuit system.

19. The combination with electrically controlled devices on a train operable upon energization to effect an application of the brakes and three main train wires connected to said devices, of a source of current normally cut out of circuit with said train wires, a switch device operable to close the circuit through said train wires, source of current and devices to effect the energization of said devices, a normally closed circuit including all of said main train wires, a source of current for said normally closed circuit, and means operating on said normally closed circuit for indicating the condition of said train wires, a testing apparatus adapted to be interposed in circuit with said train wires at any one of a plurality of points throughout the length of the train, means included in said apparatus for indicating the condition of two of said train wires ahead of the point where the apparatus is interposed in circuit, and means also included in the apparatus for indicating the condition of the other of said train wires.

20. The combination with electrically controlled devices on a train operable upon energization to effect an application of the brakes and three main train wires connected to said devices, of a source of current normally cut out of circuit with said train wires, a switch device operable to close the circuit through said train wires, source of current and devices to effect the energization of said devices, a normally closed circuit including all of said main train wires, a source of current for said normally closed circuit, and means operating on said normally closed circuit for indicating the condition of said train wires, a testing apparatus adapted to be interposed in circuit with said train wires at any one of a plurality of points throughout the length of the train, means included in said apparatus for indicating visibly the condition of two of said train wires ahead of the point where the device is interposed in circuit, and means also indicating visibly the condition of the other of said train wires.

21. The method of locating a fault in an electric train brake control system comprising a normally open circuit and a normally closed circuit associated with the normally open circuit for indicating the integrity of the normally open circuit, consisting of first energizing a portion of the normally closed circuit at the head end of the train and then successively closing the normally closed circuit at intervals from the rear of the train toward the front until the circuit system is completed in front of the fault in the system.

CLYDE C. FARMER.